United States Patent
Takarada et al.

(10) Patent No.: US 11,660,897 B2
(45) Date of Patent: May 30, 2023

(54) PRINTED MATTER

(71) Applicants: Tatsuya Takarada, Kanagawa (JP); Yuusuke Koizuka, Kanagawa (JP); Naoto Shimura, Tokyo (JP); Nozomi Terai, Tokyo (JP); Takayuki Shimizu, Kanagawa (JP); Mio Akima, Tokyo (JP)

(72) Inventors: Tatsuya Takarada, Kanagawa (JP); Yuusuke Koizuka, Kanagawa (JP); Naoto Shimura, Tokyo (JP); Nozomi Terai, Tokyo (JP); Takayuki Shimizu, Kanagawa (JP); Mio Akima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 21 days.

(21) Appl. No.: 17/450,304

(22) Filed: Oct. 8, 2021

(65) Prior Publication Data
US 2022/0118786 A1    Apr. 21, 2022

(30) Foreign Application Priority Data
Oct. 19, 2020    (JP) .............. JP2020-175141

(51) Int. Cl.
  *B41M 3/18*    (2006.01)
  *C09D 11/324*  (2014.01)
  *B41M 5/00*    (2006.01)

(52) U.S. Cl.
  CPC ............ *B41M 3/18* (2013.01); *B41M 5/0064* (2013.01); *C09D 11/324* (2013.01)

(58) Field of Classification Search
  CPC ...... B41M 3/18; B41M 5/0064; C09D 11/324
  USPC .................................................. 428/195.1
  See application file for complete search history.

(56) References Cited

U.S. PATENT DOCUMENTS

| | | | |
|---|---|---|---|
| 6,398,358 B1* | 6/2002 | Miyake | D06P 5/30 347/102 |
| 2006/0204689 A1* | 9/2006 | Tsukamoto | B41M 5/5281 428/32.38 |
| 2019/0381810 A1* | 12/2019 | Takahashi | B41M 5/0011 |
| 2020/0102467 A1 | 4/2020 | Nakamura et al. | |
| 2020/0299531 A1 | 9/2020 | Nakamura et al. | |
| 2020/0399496 A1 | 12/2020 | Nonaka et al. | |
| 2021/0062026 A1 | 3/2021 | Shimura et al. | |
| 2021/0155012 A1 | 5/2021 | Gotou et al. | |
| 2022/0118786 A1* | 4/2022 | Takarada | B44C 7/022 |

FOREIGN PATENT DOCUMENTS

| | | | |
|---|---|---|---|
| JP | 2003103925 A * | 4/2003 | ......... B41M 5/5218 |
| JP | 2008-208290 | 9/2008 | |
| JP | 2018-202843 | 12/2018 | |

OTHER PUBLICATIONS

Improved Ink Jet Recording Element, JP 2003103925 A, Vanmaele et al. (Year: 2003).*
Solid Surface Energy Data (SFE) For Common Polymers (Year: 2018).*
U.S. Appl. No. 17/381,585, filed Jul. 21, 2021, Masaki Kudo, et al.
U.S. Appl. No. 17/277,147, filed Aug. 30, 2019, Akima Mio, et al.
U.S. Appl. No. 17/422,516, filed Jan. 21, 2020, Hiromi Sakaguchi, et al.
U.S. Appl. No. 17/315,382, filed May 10, 2021, Akima Mio, et al.

* cited by examiner

*Primary Examiner* — Betelhem Shewareged
(74) *Attorney, Agent, or Firm* — Grüneberg and Myers PLLC

(57) ABSTRACT

Printed matter includes a substrate comprising a vinyl chloride resin and a printing layer on the substrate, wherein the surface of the substrate has a static friction coefficient of from 0.04 to 0.06 and a dynamic friction coefficient of from 0.02 to 0.03 when the surface of the substrate is rubbed with standard adjacent fabrics for staining for color fastness test under a load of 200 g, wherein the surface of the printing layer has a static friction coefficient of from 0.35 to 0.50 and a dynamic friction coefficient of from 0.20 to 0.30 when the surface of the printing layer is rubbed with standard adjacent fabrics for staining for color fastness test under a load of 200 g.

13 Claims, 1 Drawing Sheet

PRINTED MATTER

CROSS-REFERENCE TO RELATED APPLICATIONS

This patent application is based on and claims priority pursuant to 35 U.S.C. § 119 to Japanese Patent Application No. 2020-175141, filed on Oct. 19, 2020, in the Japan Patent Office, the entire disclosures of which is hereby incorporated by reference herein.

BACKGROUND

Technical Field

The present disclosure relates to printed matter.

Description of the Related Art

Inkjet printing is simple and readily realizes full colorization in comparison with other printing methods. High resolution images can be produced even with a simple inkjet device. For this reason, inkjet recording is now widely applied for industrial as well as home or office settings.

Fastness including abrasion resistance is required in the industrial settings, in particular, wall paper, wall cloth, and home decorating.

Ink compositions generally contain resins as ink components, which enables demonstration of features. It is well known that fastness is enhanced as the amount of resins increases.

SUMMARY

According to embodiments of the present disclosure, printed matter is provided which includes a substrate comprising a vinyl chloride resin and a printing layer on the substrate, wherein the surface of the substrate has a static friction coefficient of from 0.04 to 0.06 and a dynamic friction coefficient of from 0.02 to 0.03 when the surface of the substrate is rubbed with standard adjacent fabrics for staining for color fastness test under a load of 200 g, wherein the surface of the printing layer has a static friction coefficient of from 0.35 to 0.50 and a dynamic friction coefficient of from 0.20 to 0.30 when the surface of the printing layer is rubbed with standard adjacent fabrics for staining for color fastness test under a load of 200 g.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
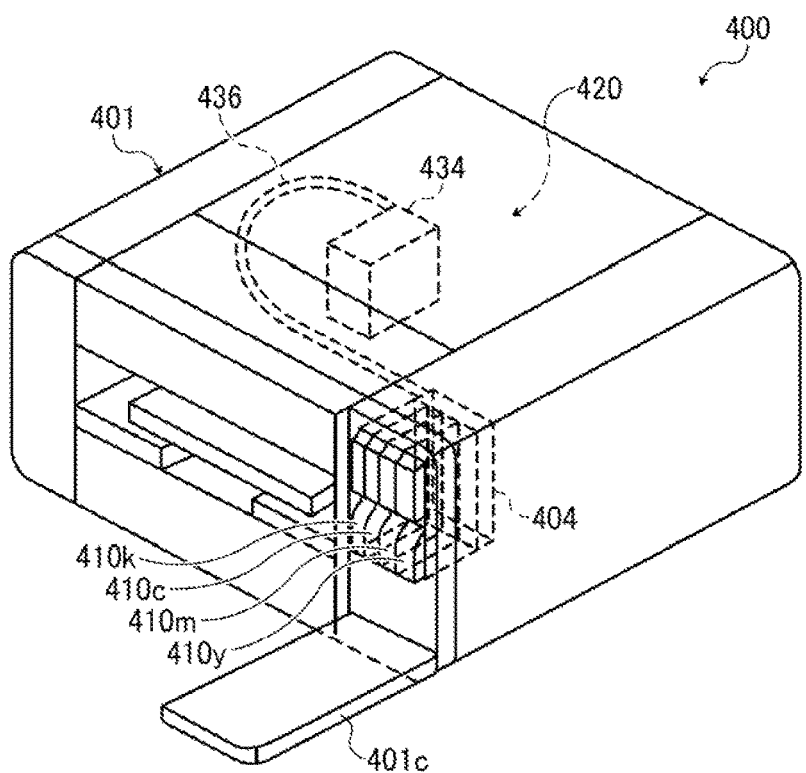
FIG. 1 is a diagram illustrating an example of an image forming device using ink.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Embodiments of the present disclosure are described below but are not limiting. The following is a description for illustration purpose only and the present disclosure is not limited thereto.

According to the present disclosure, printed matter can be provided which has excellent abrasion resistance.

The printed matter of the present disclosure has a substrate and a printing layer on the substrate.

The printing layer is formed by applying ink to the substrate with a recording (printing) device.

The printed matter, substrate, ink, and printing device are described below.

Printed Matter

The printed matter of the present disclosure is formed by applying ink to the substrate by an application device employing inkjet printing.

The substrate contains vinyl chloride resin. The surface of the substrate has a static friction coefficient of from 0.04 to 0.06 and a dynamic friction coefficient of from 0.02 to 0.03 when the surface of the substrate is rubbed with standard adjacent fabrics for staining for color fastness test under a load of 200 g.

The surface of the printing layer has a static friction coefficient of from 0.35 to 0.50 and a dynamic friction coefficient of from 0.20 to 0.30 when the surface of the printing layer is rubbed with standard adjacent fabrics for staining for color fastness test under a load of 200 g.

Printed matter having the properties mentioned above has an excellent abrasion resistance even when the substrate is wall paper made of vinyl chloride resin having a large roughness.

The standard adjacent fabrics for staining for color fastness test is cotton in the present disclosure. Hereinafter, the "standard adjacent fabrics for staining for color fastness test" is also referred to as the "cotton for staining for color fastness test".

Substrates for wall paper containing vinyl chloride resin are suitably used in the present disclosure. Such substrates are preferable because they can have a static friction coefficient of from 0.04 to 0.06 when rubbed by white cotton for staining for color fastness test under a load of 200 g.

The static friction coefficient and dynamic friction coefficient of the printing layer mentioned above are measured by cutting out a solid image of 20 mm×80 mm with a cutter from the printing layer followed by friction and wear testing under the following measuring conditions. The thickness of the printing layer is obtained by measuring three or more sites thereon with an optical microscope and averaging the measuring results. It is from 2 to 6 μm.

Measuring Conditions of Friction Test
Device: HS2000 variable normal load friction and wear measurement system (manufactured by SHINTO Scientific Co., Ltd.)
Rubbing jig: 10 mm×10 mm white cotton (Kanakin No. 3) for staining for color fastness test, according to JIS L 0803 format) (Japanese Standards Association)
Load: 200 g
Rubbing speed: 150 mm/min
Rubbing distance: 4 mm The ink used contains polycarbonate-based urethane resin having a glass transition temperature (Tg) of from −30 to −10 degrees C. and polyester-based urethane resin having a Tg of from 50 to 60 degrees C. This ink is preferable because when this ink is used for printing on a substrate that has a static friction coefficient of from 0.04 to 0.06 when rubbed with cotton for staining for color fastness test under a load of 200 g, the surface of the printing layer on the substrate has a static friction coefficient of from 0.35 to 0.50 and a dynamic friction coefficient of from 0.20 to 0.30 when rubbed with cotton for staining for color fastness test under a load of 200 g.

Substrate

The substrate has a vinyl chloride resin. Wall paper containing vinyl chloride resin is preferably used as the substrate. Wall paper containing vinyl chloride resin is present in varieties. It includes long grain emboss patterns such as wood grain having excellent reproducibility, wall paper textured like grain canvas, and flat wall paper for reproducing photo images.

The features of the surface of wall paper such as water resistance and heat resistance generally vary depending on particular applications and by surface roughness and how the surface is treated.

The "substrate containing vinyl chloride resin" and the "wall paper containing vinyl chloride resin" are hereinafter also referred respectively to as "vinyl chloride substrate" and "vinyl chloride wall paper".

The surface of wall paper is preferably treated with acrylic. It is preferable to form an acrylic resin layer on the surface of a substrate to enhance abrasion resistance. The composition of the resin layer on a surface is measured by NicoletiS10FT-IR (manufactured by Thermo SCIENTIFIC).

The surface free energy of a substrate is preferably 35 mN/m or greater. The surface free energy is evaluated by a contact angle meter (Dmo-501, manufactured by Kyowa Interface Science Co., LTD.).

The ink, the recording (printing) device, and the recording (printing device) for forming a printing layer of the printed matter of the present disclosure are described below.

Ink

The organic solvent, water, coloring material, resin, and additive for use in the ink are described below.

Organic Solvent

There is no specific limitation to the organic solvent for use in the present disclosure. For example, a water-soluble organic solvent can be used. It includes, but are not limited to, polyhydric alcohols, ethers such as polyhydric alcohol alkylethers and polyhydric alcohol arylethers, nitrogen-containing heterocyclic compounds, amides, amines, and sulfur-containing compounds.

Specific examples include, but are not limited to, polyhydric alcohols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutyl ether, diethylene glycol monomethylether, diethylene glycol monoethylether, diethylene glycol monobutyl ether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

It is preferable to use an organic solvent having a boiling point of 250 or lower degrees C., which serves as a humectant and imparts a good drying property at the same time.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyhydric alcohol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether and polyhydric alcohol arylethers such as ethylene glycol monophenylether and ethylene glycol monobenzylether.

A polyol compound having eight or more carbon atoms and a glycol ether compound enhance permeability of ink for paper used as a recording medium.

The proportion of the organic solvent in ink has no particular limit and can be suitably selected to suit to a particular application.

In terms of drying and discharging reliability of the ink, the proportion is preferably from 10 to 60 percent by mass and more preferably from 20 to 60 percent by mass.

Water

The proportion of water in the ink is not particularly limited and can be suitably selected to suit to a particular application. In terms of drying and discharging reliability of the ink, the proportion is preferably from 10 to 90 percent by mass and more preferably from 20 to 60 percent by mass.

Coloring Material

The coloring material has no particular limitation and includes materials such as a pigment and a dye.

The pigment includes an inorganic pigment or organic pigment. These can be used alone or in combination. In addition, a mixed crystal can also be used as the coloring material.

Examples of the pigments include, but are not limited to, black pigments, yellow pigments, magenta pigments, cyan pigments, white pigments, green pigments, orange pigments, and gloss or metallic pigments of gold, silver, and others.

Carbon black manufactured by known methods such as contact methods, furnace methods, and thermal methods can be used as the inorganic pigment in addition to titanium oxide, iron oxide, calcium carbonate, barium sulfate, aluminum hydroxide, barium yellow, cadmium red, and chrome yellow.

Specific examples of the organic pigment include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelates and acid dye type chelates), nitro pigments, nitroso pigments, and aniline black. Of those pigments, pigments having good affinity with solvents are preferable. Hollow resin particles and hollow inorganic particles can also be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51, C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63, C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

Pigment Dispersion

The ink can be obtained by mixing a pigment with materials such as water and an organic solvent. It is also possible to mix a pigment with water, a dispersant, and other substances to prepare a pigment dispersion and thereafter mix the pigment dispersion with materials such as water and an organic solvent to manufacture an ink.

The pigment dispersion can be obtained by dispersing water, a pigment, a pigment dispersant, and other optional components and adjusting the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be analyzed using a particle size analyzer (Nanotrac Wave-UT151, manufactured by MicrotracBEL Corp).

The proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with an instrument such as filter and a centrifuge to remove coarse particles followed by deaerating.

Resin

The type of the resin contained in ink has no particular limit and can be suitably selected to suit to a particular application. It includes, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particles made of such resins can be also used. It is possible to mix a resin emulsion in which such resin particles are dispersed in water as a dispersion medium with materials such as a coloring material and an organic solvent to obtain an ink. It is possible to use suitably-synthesized resin particles as the resin particle. Alternatively, the resin particle available on the market can be used. The resin particle can be used alone or two or more type of the resin particles can be used in combination.

The volume average particle diameter (mean volume diameter) of the resin particle is not particularly limited and can be suitably selected to suit to a particular application. The mean volume diameter is preferably from 10 to 1,000 nm, more preferably from 10 to 200 nm, and particularly preferably from 10 to 100 nm to achieve good fixability and image robustness.

The volume average particle diameter can be measured by using a device such as a particle size analyzer (Nanotrac Wave-UT151, manufactured by MicrotracBEL Corp.).

The proportion of the content of the resin is not particularly limited and can be suitably selected to suit to a particular application. It is preferably from 1 to 30 percent by mass and more preferably from 5 to 20 percent by mass of the total mass of the ink to secure fixability and storage stability of the ink.

The particle diameter of the solid portion in the ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as optical density. The solid content includes resin particles and particles of pigment. The particle diameter can be measured by using a particle size analyzer (Nanotrac Wave-UT151, manufactured by MicrotracBEL Corp).

Additive

The ink may further optionally include additives such as a surfactant, defoaming agent, preservative and fungicide, corrosion inhibitor, and pH regulator.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. Of these, surfactants not decomposable in a high pH environment are preferable. Examples of the silicone-based surfactants include, but are not limited to, side chain modified polydimethyl siloxane, both terminal-modified polydimethyl siloxane, one-terminal-modified polydimethyl siloxane, and side-chain-both-terminal-modified polydimethyl siloxane. In particular, silicone-based surfactants having a polyoxyethylene group or a polyoxyethylene polyoxypropylene group as a modification group are particularly preferable because such an aqueous surfactant demonstrates good properties. It is possible to use a polyether-modified silicone-based surfactant as the silicone-based surfactant. A specific example is a compound in which a polyalkylene oxide structure is introduced into the side chain of the Si site of dimethyl silooxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carbonic acid compounds include, but are not limited to, perfluoroalkyl carbonic acid and salts of perfluoroalkyl carbonic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The proportion of the surfactant in the ink is not particularly limited and can be suitably selected to suit to a particular application. For example, the proportion is preferably from 0.001 to 5 percent by mass and more preferably from 0.05 to 5 percent by mass to achieve excellent wettability and discharging stability and improve image quality.

Defoaming Agent

The defoaming agent has no particular limit. Examples include, but are not limited to silicon-based defoaming agents, polyether-based defoaming agents, and aliphatic acid ester-based defoaming agents. These can be used alone or in combination. Of these, silicone-based defoaming agents are preferable to achieve the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to be not lower than 7. Specific examples include, but are not limited to, amines such as diethanol amine and triethanol amine.

Properties of the ink are not particularly limited and can be suitably selected to suit to a particular application; viscosity, surface tension, and pH are preferable in the following ranges.

The ink preferably has a viscosity of from 5 to 30 mPa·s and more preferably from 5 to 25 mPa·s at 25 degrees C. to enhance the print density and text quality and achieve a good dischargibility. Viscosity can be measured by equipment such as a rotatory viscometer (RE-80L, manufactured by TOKI SANGYO CO., LTD.). The measuring conditions areas follows:

Standard cone rotor (1°34'×R24)

Sample liquid amount: 1.2 mL

Rate of rotation: 50 rotations per minute (rpm)

25 degrees C.

Measuring time: three minutes.

The surface tension of the ink is preferably 35 mN/m or less and more preferably 32 mN/m or less at 25 degrees C. because the ink suitably levels on a recording medium and the ink dries in a shorter time.

pH of the ink is preferably from 7 to 12 and more preferably from 8 to 11 to prevent corrosion of metal material in contact with liquid.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices such as 3D printers and additive manufacturing devices.

In the present disclosure, the recording device and the recording method respectively represent a device capable of discharging ink and liquids such as various processing fluids to a recording medium and a method of recording utilizing such a device. The recording medium means an item to which ink or various processing fluids can be temporarily or permanently attached.

The recording device may further optionally include a device relating to feeding, conveying, and ejecting a recording medium and other devices referred to as a pre-processing device, a post-processing device in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the recording device and the recording method are no t limited to those producing meaningful visible images such as text and figures with ink. For example, the recording method and the recording device capable of producing patterns like geometric design and 3D images are included.

In addition, the recording device includes both a serial type device in which the discharging head moves and a line type device in which the discharging head is not moved, unless otherwise specified.

Furthermore, in addition to the desktop type, this recording device includes a device capable of printing images on a wide recording medium having, for example, AO size, and a continuous printer capable of using continuous paper rolled up in a roll-like form as a recording medium.

Figure 2:
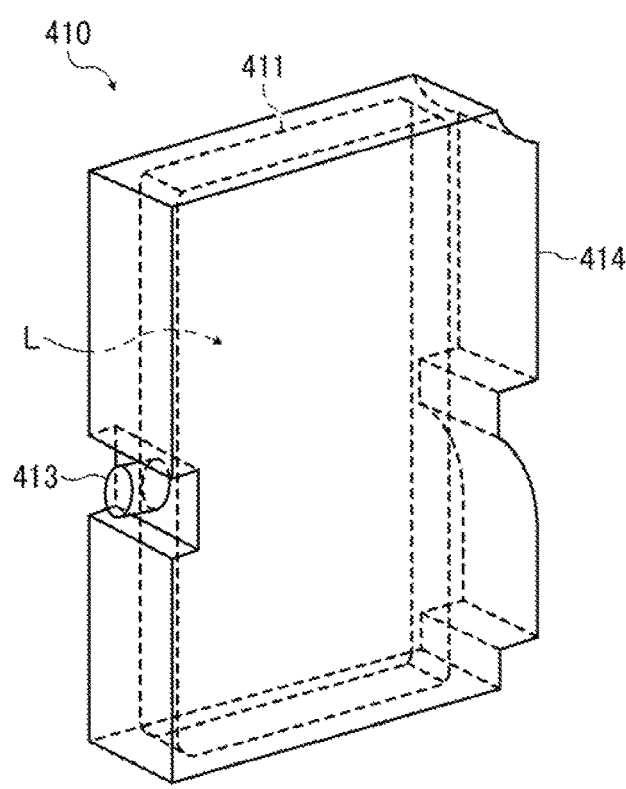
FIG. 2 is a diagram illustrating a perspective view of a tank accommodating ink.

The recording device is described using an example with reference to FIG. 1 and FIG. 2. FIG. 1 is a diagram illustrating a perspective view of the image forming apparatus. FIG. 2 is a diagram illustrating a perspective view of a tank. An image forming apparatus 400 as an embodiment of the recording device is a serial type image forming apparatus. A mechanical unit 420 is disposed in an exterior 401 of the image forming apparatus 400. Each ink accommodating unit (ink container) 411 of each tank 410 (410k, 410c, 410m, and 410y) for each color of black (K), cyan (C), magenta (M), and yellow (Y) is made of a packaging member such as aluminum laminate film. The ink accommodating unit 411 is housed in, for example, a plastic container housing unit 414 and L represents liquid contained in the ink accommodating unit 411. As a result, the tank 410 is used as an ink cartridge of each color.

A cartridge holder 404 is disposed on the rear side of the opening appearing when a cover 401c is opened. The tank 410 is detachably attached to the cartridge holder 404. In this configuration, each ink discharging outlet 413 of the tank 410 communicates with a discharging head 434 for each color via a supplying tube 436 for each color and the ink can be discharged from the discharging head 434 to a recording medium.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but are not limited thereto.

Preparation of Black Pigment Dispersion

Black pigment dispersion was manufactured in the same manner as in—Method A—of pigment surface reforming treatment disclosed in Japanese Unexamined Patent Application Publication No. 2012-207202.

A total of 20 g of carbon black (NIPEX160, manufactured by Degussa AG), 20 mmol of the compound represented by Chemical Structure 1 below, and 200 mL of deionized water were mixed by Silverson mixer (6,000 rpm, 0.6 percent by mass) at room temperature to obtain a slurry. When the obtained slurry had a pH higher than 4, 20 mmol of nitric acid was added. Thirty (30) minutes later, 20 mmol of sodium nitrite dissolved in a minute amount of deionized water was slowly added to the slurry. Furthermore, the temperature was raised to 60 degrees C. while the mixture was stirred to allow reaction for one hour. The compound represented by Chemical Structure 1 illustrated below was added to the surface of the carbon black to produce a reformed pigment. Thereafter, the pH was adjusted to 10 by NaOH aqueous solution. Thirty minutes later, a reformed pigment dispersion was obtained 30 minutes later. The reformed pigment dispersion and deionized water were subjected to ultrafiltering utilizing dialysis membrane. Thereafter, the resulting filtrate was subjected to ultrasonic wave dispersion to obtain a black pigment dispersion (self-dispersion type) having a bisphosphonic acid group as a hydrophilic functional group to achieve a pigment concentration of 15 percent by mass.

Chemical Structure 1

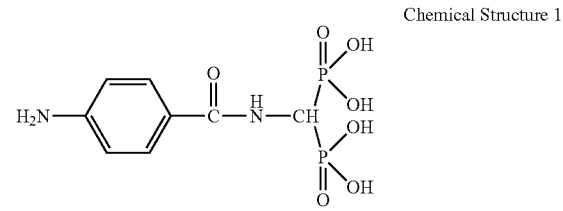 [SMILES: Nc1ccc(C(=O)NC(P(=O)(O)O)P(=O)(O)O)cc1]

Preparation of Liquid of Resin Particles

Preparation of Liquid 1 of Polycarbonate-based Urethane Resin Particles A total of 1,500 g of polycarbonate diol (reaction product of 1,6-hexane diol and dimethyl carbonate, the number average molecular weight Mn of 1,200), 220 g of 2,2-dimethylol propionic acid (DMPA), and 1,347 g of N-methyl pyrrolidone (NMP) were charged in a reaction container equipped with a stirrer, a reflux cooling tube, and a thermometer in a nitrogen atmosphere followed by heating to 60 degrees C. to dissolve DMPA.

Thereafter, 1,445 g of 4,4'-dicyclohexyl methane diisocyanate and 2.6 g of dibutyl tin dilaurylate (catalyst) were added thereto followed by heating to 90 degrees C. to complete urethanification reaction in five hours. As a result, an isocyanate-terminated urethane prepolymer was obtained. This reaction mixture was cooled down to 80 degrees C. and 149 g of triethyl amine was admixed therewith. Thereafter, 4,340 g of the resulting mixture was extracted and charged in a liquid mixture of 5,400 g of water and 15 g of triethyl amine under vigorous stirring.

Next, 1,500 g of ice and 626 g of 2-methyl-1,5-pentane diamine aqueous solution at 35 percent by mass were added to allow chain elongation reaction followed by distillation away of the solvent to achieve a solid portion concentration of 40 percent by mass. Liquid 1 of polycarbonate-based urethane resin particles was thus obtained. The Tg of the resin of the liquid 1 was measured. It was −20 degrees C.

Measuring of Glass Transition Temperature

The glass transition temperature of the resin was measured using a DSC system (Q-2000, manufactured by TA Instruments). First, the liquid of resin particles was dried in an oven at 70 degrees C. for 12 hours. Five (5) mg of the solid portion was placed in an aluminum sample container. The container was placed in the system and measured in a nitrogen atmosphere under the following measuring conditions 1 to 4. The DSC curve obtained during the second temperature rising was selected. The glass transition temperature was obtained by the midpoint method.

1. Cooled down to −70 degrees C. which was maintained for five minutes
2. Raised to 120 degrees C. at temperature rising rate of 10 degrees C./min
3. Cooled down to −70 degrees C. which was maintained for five minutes
4. Raised to 120 degrees C. at temperature rising rate of 10 degrees C./min Preparation of Liquid 2 of Polyester-Based Urethane Resin Particles Liquid 2 of polyester-based urethane resin particles having a solid portion concentration of 30 percent by mass was obtained in the same manner as in Preparation of Liquid 1 of Polycarbonate-based Urethane Resin Particles except that polycarbonate diol was replaced with polyester polyol (POLYLITE OD-X-2251, weight average molecular weight of 2,000, manufactured by DIC Corporation)

The Tg of the resin of the liquid 2 was measured in the same manner as in Preparation of Liquid 1 of Polycarbonate-based Urethane Resin Particles. It was 57 degrees C.

Preparation of Ink
Preparation of Ink 1
The following was mixed and stirred:
Black pigment dispersion mentioned above (concentration of solid portion of 15.00 percent by mass) at 15.00 percent by mass
Liquid 1 of polycarbonate-based urethane resin particles (concentration of solid portion of 40.00 percent by mass) at 25.00 percent by mass
Liquid 2 of polyester-based urethane resin particles (concentration of solid portion of 30.00 percent by mass) at 12.00 percent by mass
1,2-propane diol (manufactured by Tokyo Chemical Industry Co. Ltd.) at 15.00 percent by mass
3-methoxy-3-methyl-1-butanol (manufactured by KURARAY CO., LTD.) at 15.00 percent by mass)
2,3-butane diol (manufactured by Tokyo Chemical Industry Co. Ltd.) at 5 percent by mass
2-ethylhexyl alcohol (manufactured by Tokyo Chemical Industry Co. Ltd.) at 3.00 percent by mass
Polyether-modified surfactant (Wet270, manufactured by TEGO) at 1.00 percent by mass
Preservative (Proxel LV, manufactured by Arch Chemical, Inc.) at 0.10 percent by mass
Highly pure water: balance.

The resulting mixture was filtered with a polypropylene filter having an average pore diameter of 1.00 μm to obtain Ink 1.

Preparation of Inks 2 to 15

Inks 2 to 15 were prepared in the same manner as in the method of Preparation of Ink 1 using the materials shown in Table 1.

The Ink prescriptions are shown in Table 1.

Example 1

A solid color image of 100 percent gradation was printed with an inkjet printer (IPSiO Gxe 5500, manufactured by Ricoh Co., Ltd.) filled with Ink 1 on vinyl chloride wall paper (PRSO101S, vinyl chloride with an average thickness of 200 μm having acrylic resin layer on the surface, manufactured by LINTEC Corporation) with ink droplets each having a volume of 21 pL and a resolution of 60 dpi×600 dpi. The image was dried and fixed at 70 degrees by passage of a heated wind drying unit to obtain printed matter of Example 1.

Examples 2 to 11

Printed matter of Examples 2 to 11 was obtained in the same manner as in Example 1 except that ink 1 was replaced with inks 2 to 11.

Note that GIY12Z5 of LINTEC Corporation free of an acrylic resin layer on the surface was used in Example 9 and GIY11Z5 of LINTEC Corporation free of an acrylic resin layer on the surface was used in Example 10.

Comparative Examples 1 to 4

Printed matter of Comparative Examples 1 to 4 was obtained in the same manner as in Example 1 except that ink 1 was replaced with inks 12 to 15 and vinyl chloride wall paper free of an acrylic resin layer was used.

Vinyl chloride wall paper of AVERY DENNISON was used in Comparative Examples 1, 2, and 4 and GIY11Z5 of LINTEC Corporation was used in Comparative Example 3.

Measuring of Static Friction Coefficient and Dynamic Friction Coefficient of Substrate and Printing Layer The static friction coefficient and dynamic friction coefficient of a substrate are measured by cutting it out by 20 mm×80 mm with a cutter followed by friction and wear testing under the following measuring conditions.

The static friction coefficient and dynamic friction coefficient of a printing layer are measured by cutting out a solid image of 20 mm×80 mm with a cutter from the printing layer followed by friction and wear testing under the following measuring conditions. The thickness of the printing layer is obtained by measuring three or more sites thereon with an optical microscope and averaging the measuring results. It is from 2 to 6 μm.

The measuring results are shown in Table 1.

Measuring Conditions of Friction Test
Device: HHS2000 variable normal load friction and wear measurement system (manufactured by SHINTO Scientific Co., Ltd.)
Rubbing jig: 10 mm×10 mm cotton
Load: 200 g
Rubbing speed: 150 mm/min
Rubbing distance: 4 mm
Static friction coefficient of vinyl chloride substrate: 0.05
Dynamic friction coefficient of vinyl chloride substrate: 0.02
Thickness of printing layer: 3.4 μm
Evaluation on Abrasion Resistance The obtained printed matter was cut to a size of 2.5 cm×20 cm and placed in a rubbing color fastness tester (AR-2, manufactured by INTEC CO., LTD.). The printed matter was rubbed back and forth at 30 times/min with dried white cloth (Kanakin No. 3) under a load of 200 g. The printed matter and white cloth were individually observed and evaluated regarding the following abrasion resistances 1 to 3. The printed matter graded B or above is usable for practical purpose.

Abrasion resistance 1: rubbed back and forth 25 times
Abrasion resistance 2: rubbed back and forth 50 times
Abrasion resistance 3: rubbed back and forth 100 times
The evaluation results are shown in Table 2.
Evaluation Criteria
AA: Vinyl chloride substrate was not exposed free of color transfer to white cloth
A: Vinyl chloride substrate was not exposed while slightly transferred to white cloth
B: Vinyl chloride was partially exposed and color was transferred to a part of white cloth
C: Vinyl chloride substrate was partially exposed and color was transferred to all over white cloth.
D: More than a half of vinyl chloride substrate was exposed
Presence of Acrylic Resin Layer
The surface of the substrate was subjected to IR measurement. Wall paper with an acrylic resin layer on the surface was represented by Yes and wall paper without an acrylic resin layer was represented by No.

Substrates having a surface free energy of 35 mN/m or greater were represented by Yes and substrates having a surface free energy less than 35 mN/m were represented by No.

TABLE 1

| | | Ink No. | | | | |
|---|---|---|---|---|---|---|
| | | 1 | 2 | 3 | 4 | 5 |
| Solvent | 1,2-propane diol | 15.00 | 15.00 | 20.00 | 18.00 | 12.00 |
| | 3-methoxy-3-methyl-1-butanol | 15.00 | 15.00 | 10.00 | 12.00 | 18.00 |
| | 2,3-butane diol | 5.00 | 5.00 | 5.00 | 5.00 | 5.00 |
| | 2-ethylhexyl alcohol | 3.00 | 3.00 | 3.00 | 3.00 | 3.00 |
| Surfactant | WET-270 | 2.00 | 1.00 | 1.00 | 1.00 | 1.00 |
| Antibacterial agent | PROXEL LV | 0.10 | 0.10 | 0.10 | 0.10 | 0.10 |
| Water | Highly pure water | 4.90 | 5.90 | 25.90 | 5.90 | 5.90 |
| Resin | Liquid of polycarbonate-based urethane resin particle | 25.00 | 25.00 | 12.00 | 25.00 | 25.00 |
| | Liquid of polyester-based urethane resin particle | 15.00 | 15.00 | 8.00 | 15.00 | 15.00 |
| Pigment dispersion | Black pigment dispersion | 15.00 | 15.00 | 15.00 | 15.00 | 15.00 |
| Total | | 100.00 | 100.00 | 100.00 | 100.00 | 100.00 |

| | | Ink No. | | | | |
|---|---|---|---|---|---|---|
| | | 6 | 7 | 8 | 9 | 10 |
| Solvent | 1,2-propane diol | 22.00 | 18.00 | 20.00 | 20.00 | 20.00 |
| | 3-methoxy-3-methyl-1-butanol | 10.00 | 12.00 | 10.00 | 10.00 | 10.00 |
| | 2,3-butane diol | 5.00 | 5.00 | 5.00 | 5.00 | 5.00 |
| | 2-ethylhexyl alcohol | 3.00 | 3.00 | 3.00 | 3.00 | 3.00 |
| Surfactant | WET-270 | 1.00 | 1.00 | 2.00 | 1.00 | 1.00 |
| Antibacterial agent | PROXEL LV | 0.10 | 0.10 | 0.10 | 0.10 | 0.10 |
| Water | Highly pure water | 23.90 | 25.90 | 24.90 | 25.90 | 25.90 |
| Resin | Liquid of polycarbonate-based urethane resin particle | 12.00 | 12.00 | 12.00 | 12.00 | 12.00 |
| | Liquid of polyester-based urethane resin particle | 8.00 | 8.00 | 8.00 | 8.00 | 8.00 |
| Pigment dispersion | Black pigment dispersion | 15.00 | 15.00 | 15.00 | 15.00 | 15.00 |
| Total | | 100.00 | 100.00 | 100.00 | 100.00 | 100.00 |

| | | Ink No. | | | | |
|---|---|---|---|---|---|---|
| | | 11 | 12 | 13 | 14 | 15 |
| Solvent | 1,2-propane diol | 20.00 | 12.00 | 15.00 | 18.00 | 18.00 |
| | 3-methoxy-3-methyl-1-butanol | 10.00 | 18.00 | 15.00 | 12.00 | 12.00 |
| | 2,3-butane diol | 5.00 | 5.00 | 5.00 | 5.00 | 5.00 |
| | 2-ethylhexyl alcohol | 3.00 | 3.00 | 3.00 | 3.00 | 3.00 |
| Surfactant | WET-270 | 1.00 | 1.00 | 1.00 | 1.00 | 1.00 |
| Antibacterial agent | PROXEL LV | 0.10 | 0.10 | 0.10 | 0.10 | 0.10 |
| Water | Highly pure water | 25.90 | 5.90 | 5.90 | 25.90 | 25.90 |
| | Liquid of polycarbonate- | 12.00 | 25.00 | 25.00 | 12.00 | 12.00 |

TABLE 1-continued

| Resin | based urethane resin particle | | | | | |
|---|---|---|---|---|---|---|
| | Liquid of polyester-based urethane resin particle | 8.00 | 15.00 | 15.00 | 8.00 | 8.00 |
| Pigment dispersion | Black pigment dispersion | 15.00 | 15.00 | 15.00 | 15.00 | 15.00 |
| Total | | 100.00 | 100.00 | 100.00 | 100.00 | 100.00 |

The figure of each ink component is represented in percent by mass.

TABLE 2

| | | Example | | | | | |
|---|---|---|---|---|---|---|---|
| | | 1 | 2 | 3 | 4 | 5 | 6 |
| | Ink used | Ink 1 | Ink 2 | Ink 3 | Ink 4 | Ink 5 | Ink 6 |
| Surface of substrate | Acrylic resin layer | Yes | Yes | Yes | Yes | Yes | Yes |
| Measuring and evaluation results | Static friction coefficient of substrate | 0.05 | 0.05 | 0.05 | 0.05 | 0.05 | 0.05 |
| | Dynamic friction coefficient of substrate | 0.02 | 0.02 | 0.02 | 0.02 | 0.02 | 0.02 |
| | Static friction coefficient of printing layer | 0.40 | 0.45 | 0.50 | 0.45 | 0.35 | 0.40 |
| | Dynamic friction coefficient of printing layer | 0.25 | 0.25 | 0.30 | 0.30 | 0.20 | 0.20 |
| | Surface free energy of substrate | Yes | Yes | Yes | Yes | Yes | Yes |
| | Abrasion resistance 1 (back and forth 25 times) | AA | AA | AA | AA | AA | AA |
| | Abrasion resistance 2 (back and forth 50 times) | AA | A | A | AA | A | A |
| | Abrasion resistance 3 (back and forth 100 times) | A | A | B | A | B | A |

| | | Example | | | | |
|---|---|---|---|---|---|---|
| | | 7 | 8 | 9 | 10 | 11 |
| | Ink used | Ink 7 | Ink 8 | Ink 9 | Ink 10 | Ink 11 |
| Surface of substrate | Acrylic resin layer | Yes | Yes | No | No | Yes |
| Measuring and evaluation results | Static friction coefficient of substrate | 0.05 | 0.05 | 0.06 | 0.04 | 0.04 |
| | Dynamic friction coefficient of substrate | 0.02 | 0.02 | 0.03 | 0.02 | 0.02 |
| | Static friction coefficient of printing layer | 0.50 | 0.35 | 0.40 | 0.50 | 0.50 |
| | Dynamic friction coefficient of printing layer | 0.20 | 0.25 | 0.25 | 0.25 | 0.25 |
| | Surface free energy of substrate | Yes | Yes | Yes | No | No |
| | Abrasion resistance 1 (back and forth 25 times) | A | AA | A | A | A |
| | Abrasion resistance 2 (back and forth 50 times) | A | AA | A | A | A |
| | Abrasion resistance 3 (back and forth 100 times) | B | A | B | B | B |

| | | Comparative Example | | | |
|---|---|---|---|---|---|
| | | 1 | 2 | 3 | 4 |
| | Ink used | Ink 12 | Ink 13 | Ink 14 | Ink 15 |
| Surface of substrate | Acrylic resin layer | No | No | No | No |
| Measuring and evaluation results | Static friction coefficient of substrate | 0.04 | 0.07 | 0.04 | 0.05 |
| | Dynamic friction coefficient of substrate | 0.01 | 0.03 | 0.02 | 0.02 |
| | Static friction coefficient of printing layer | 0.50 | 0.50 | 0.50 | 0.55 |
| | Dynamic friction coefficient of printing layer | 0.30 | 0.30 | 0.35 | 0.30 |
| | Surface free energy of substrate | No | Yes | No | Yes |
| | Abrasion resistance 1 (back and forth 25 times) | A | A | B | C |

TABLE 2-continued

| | | | | |
|---|---|---|---|---|
| Abrasion resistance 2 (back and forth 50 times) | B | B | B | D |
| Abrasion resistance 3 (back and forth 100 times) | B | B | C | D |

The present disclosure is related to the printed matter of the following 1 and also includes the following 2 to 4 as embodiments.

1. Printed matter includes a substrate containing a vinyl chloride resin and a printing layer on the substrate, wherein the surface of the substrate has a static friction coefficient of from 0.04 to 0.06 and a dynamic friction coefficient of from 0.02 to 0.03 when the surface of the substrate is rubbed with standard adjacent fabrics for staining for color fastness test under a load of 200 g, wherein the surface of the printing layer has a static friction coefficient of from 0.35 to 0.50 and a dynamic friction coefficient of from 0.20 to 0.30 when the surface of the printing layer is rubbed with standard adjacent fabrics for staining for color fastness test under a load of 200 g.

2. The printed matter according to 1 mentioned above, wherein the surface of the substrate contains an acrylic resin layer.

3. The printed matter according to 1 or 2 mentioned above, wherein the substrate is wall paper.

4. The printed matter according to any one of 1 to 3 mentioned above, wherein the substrate has a surface free energy of 35 mN/m or greater.

The invention claimed is:

1. Printed matter, comprising:
   a substrate comprising a vinyl chloride resin; and
   a printing layer on the substrate;
   wherein a surface of the substrate has a static friction coefficient of from 0.04 to 0.06 and a dynamic friction coefficient of from 0.02 to 0.03 when the surface of the substrate is rubbed with standard adjacent fabrics for staining for color fastness test under a load of 200 g,
   wherein a surface of the printing layer has a static friction coefficient of from 0.35 to 0.50 and a dynamic friction coefficient of from 0.20 to 0.30 when the surface of the printing layer is rubbed with standard adjacent fabrics for staining for color fastness test under a load of 200 g,
   wherein the printing layer is formed from an ink comprising a polycarbonate-based urethane resin have a glass transition temperature of from −30 to −10 degrees C. and a polyester-based urethane resin having a Tg of from 50 to 60 degrees C.

2. The printed matter according to claim 1, wherein the surface of the substrate comprises an acrylic resin layer.

3. The printed matter according to claim 1, wherein the substrate comprises wall paper.

4. The printed matter according to claim 1, wherein the substrate has a surface free energy of 35 mN/m or greater.

5. The printed matter according to claim 1, wherein the ink comprises 12 to 25 percent by mass of the polycarbonate-based urethane resin have a glass transition temperature of from −30 to −10 degrees C. and 8 to 15 percent by mass of the polyester-based urethane resin having a Tg of from 50 to 60 degrees C.

6. The printed matter according to claim 1, wherein the ink comprises 10 to 60 percent by mass of an organic solvent and 10 to 90 percent by mass of water.

7. The printed matter according to claim 1, wherein the ink comprises a black ink.

8. The printed matter according to claim 7, wherein the surface of the substrate comprises an acrylic resin layer.

9. The printed matter according to claim 8, wherein the substrate comprises wall paper.

10. The printed matter according to claim 7, wherein the substrate has a surface free energy of 35 mN/m or greater.

11. The printed matter according to claim 5, wherein the ink comprises a black ink.

12. The printed matter according to claim 11, wherein the surface of the substrate comprises an acrylic resin layer.

13. The printed matter according to claim 12, wherein the substrate has a surface free energy of 35 mN/m or greater.

* * * * *